United States Patent [19]
Mare

[11] 3,785,127
[45] Jan. 15, 1974

[54] SCRUBBING APPARATUS

[75] Inventor: Ernest Mare, Johannesburg, Transvaal, South Africa

[73] Assignee: J. Ronald Hershberger, Palo Alto, Calif.

[22] Filed: Feb. 22, 1971

[21] Appl. No.: 117,348

[52] U.S. Cl. .................... 55/233, 55/257, 55/440, 55/487, 261/100, 261/116
[51] Int. Cl. ............................. B01d 47/06
[58] Field of Search .............. 55/84, 89, 90, 93, 55/94, 240, 241, 222, 226, 227, 228, 229, 233, 257, 440, 487; 261/22, 107, 100, 116

[56] References Cited
UNITED STATES PATENTS

| | | | |
|---|---|---|---|
| 885,185 | 4/1908 | Serrell | 55/227 |
| 907,634 | 12/1908 | Novowetz | 55/240 |
| 1,117,309 | 11/1914 | Bentz | 55/228 X |
| 1,222,541 | 4/1917 | Donham | 55/94 |
| 1,223,082 | 4/1917 | Lissauer | 55/227 |
| 1,625,831 | 4/1927 | Stark | 55/90 |
| 3,036,417 | 5/1962 | Mare | 55/90 X |
| 3,237,381 | 3/1966 | Mvostoff | 55/89 |
| 3,266,224 | 8/1966 | Ferretti | 55/241 |
| 3,522,000 | 7/1970 | Kinney | 55/233 X |
| 3,550,356 | 12/1970 | Abboud | 55/241 X |
| 3,653,186 | 4/1972 | McLendon | 55/240 |
| 3,656,279 | 4/1972 | McIlvaine | 55/240 |

FOREIGN PATENTS OR APPLICATIONS 478,081   4/1925   Germany ........................ 55/241

*Primary Examiner*—Robert Halper
*Attorney*—Flehr, Hohbach, Test, Albritton & Herbert

[57] ABSTRACT

An apparatus for scrubbing a stream of air or other gas with a scrubbing liquid (e.g., water). The scrubbing is carried out in successive stages simultaneously with classification of the removed material, the removed material being withdrawn as separate fractions. Each stage is provided with means for scrubbing the gas with liquid droplets and by impingement with surfaces wet with liquid, and also with means for eliminating droplets whereby they are not delivered to the next scrubbing stage.

8 Claims, 7 Drawing Figures

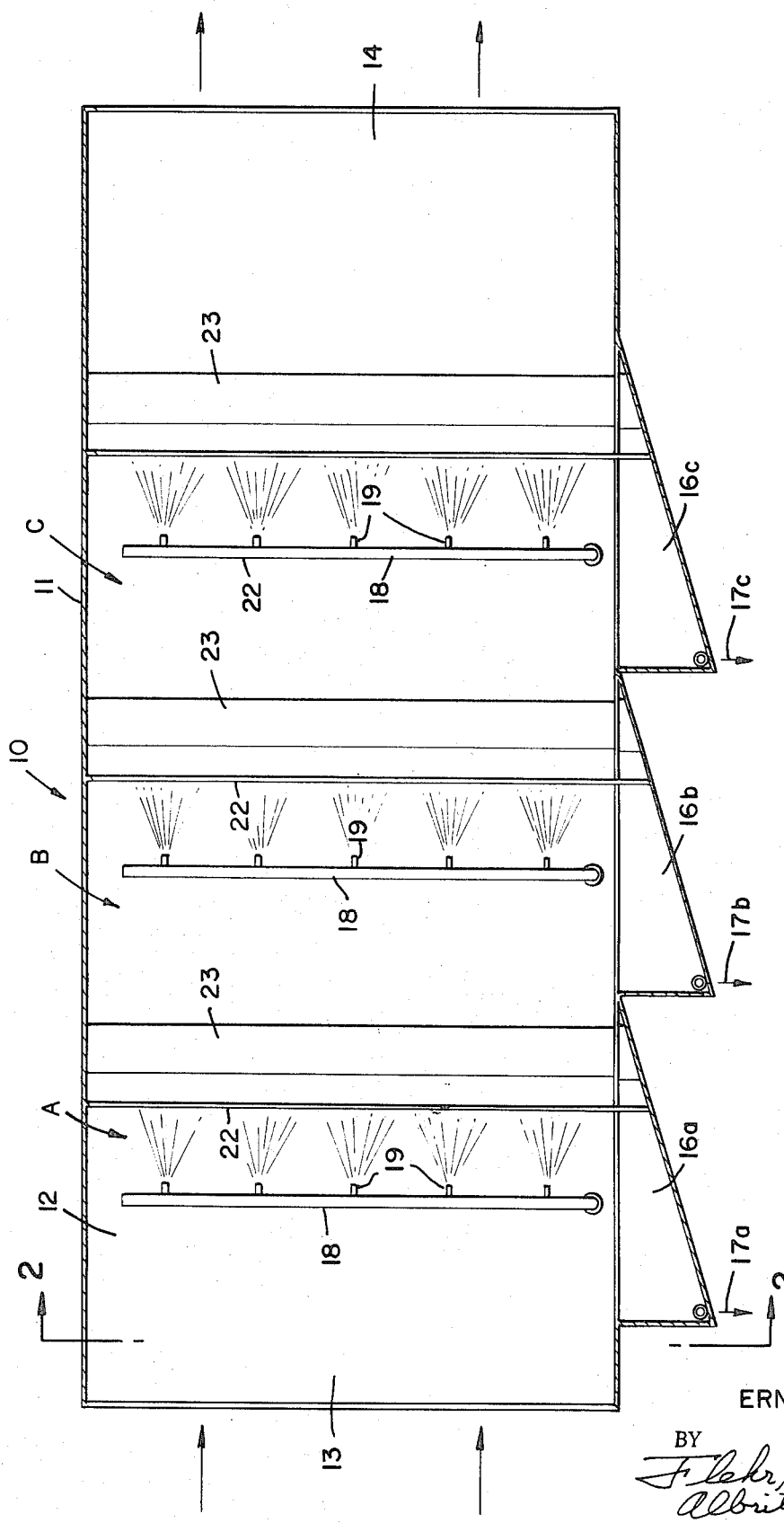
FIG_1
INVENTOR.
ERNEST MARE

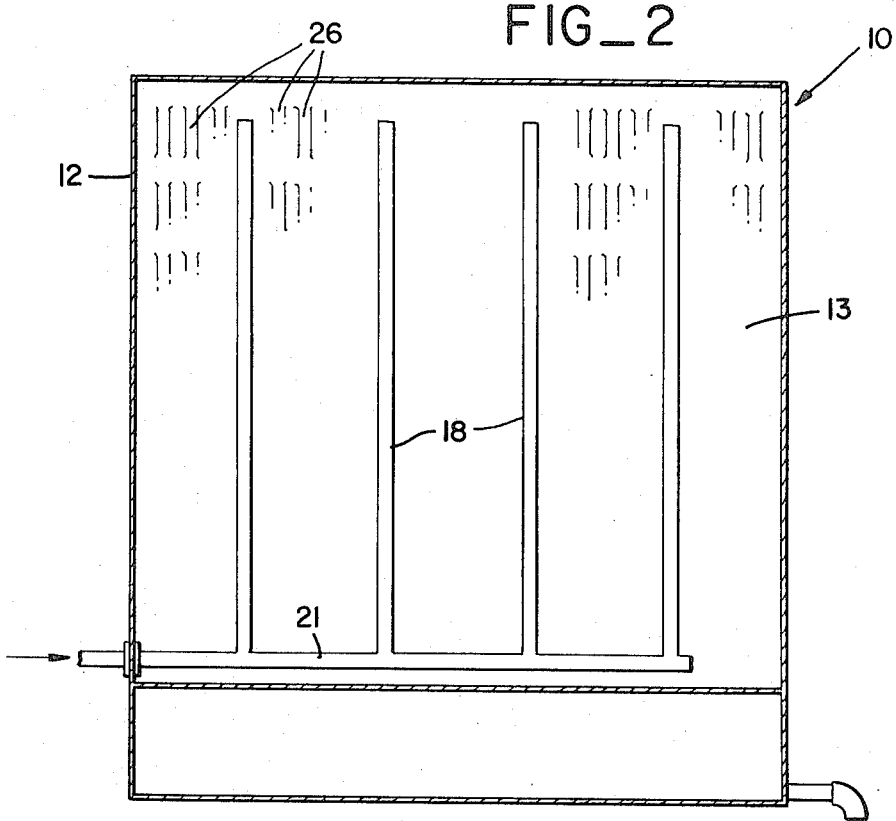
FIG_2
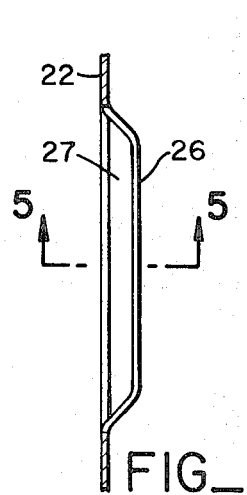
FIG_4
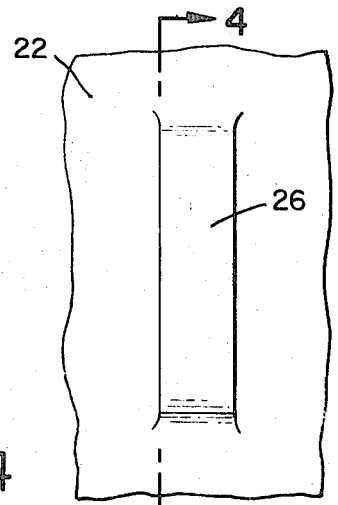
FIG_3
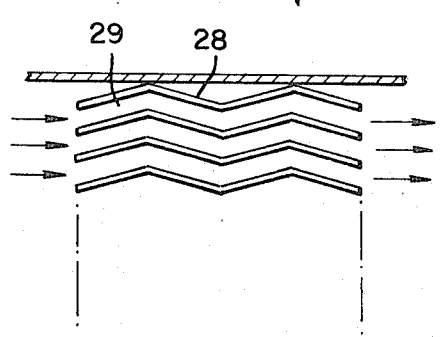
FIG_7
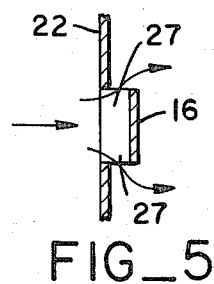
FIG_5
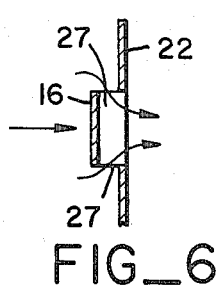
FIG_6
INVENTOR.
ERNEST MARE 3,785,127

SCRUBBING APPARATUS

BACKGROUND OF THE INVENTION

This invention relates generally to scrubbing apparatus of the type in which gas is subjected to the scrubbing action of water or other scrubbing liquid.

Scrubbers are commonly employed for removing various materials or contaminants from air or other gases. Typical apparatus consists of a housing equipped with nozzles which discharge sprays of the scrubbing liquid against one or more screens or grids. When a stream of the gas to be cleaned is directed through the housing, the gas passes through the water sprays and screens or grids, with materials like dust particles being wet by contact with water droplets and by impingement of the solid particles on films of liquid on the screen or grid. Water droplets entrained in the airflow are removed by a so-called eliminator, which may consist of baffles arranged to provide tortuous paths for the flow. The removed contaminants are withdrawn with the water which collects in the lower part of the housing.

The construction of the screens and grids as well as the control of sprays largely determines the effectiveness of the scrubbing operations. It has been found that a series of screens is most effective, but difficulty is often encountered in obtaining the elimination of fine particles in the arrangements at present in use.

Further known scrubbers frequently produce a slurry of the removed material which is not usable unless further processed. The removed solids of the slurry will vary according to the source of contaminated air or gas, but in typical instances will include relatively insoluble solid particles of varying sizes, densities and wettability, solids that are relatively soluble and which appear in the removed slurry in dissolved form, solids that are partially soluble and which appear in the slurry partly in solution and partly as solid particles, and contaminating gases or vapors, which are readily soluble or absorbable in water or other scrubbing liquid and which are in the slurry in dissolved or absorbed form. Processing of such slurry may include classification to separate the undissolved solids into different fractions, and dewatering for the removal of dissolved solids in an effluent.

SUMMARY OF THE INVENTION

An object of the invention is to provide a apparatus which will facilitate the removal of small particles of minus 20 microns in size and which may also result in classification and removal of material from the gas stream in separate fractions.

Another object is to provide an apparatus of the above character which will have effective scrubbing action and which makes use of novel slotted plates against which the spray is directed and through which the gas is caused to flow.

In general the removal of small particles or classification and removal of material from the gas stream is carried out by passing a gas flow through a plurality of screens in a gas flow passage while spraying liquid onto said screens wherein at least one screen following the first in the series is formed as a plate with a plurality of punched out strip portions offset with respect to the plane of the plate to provide slits between the plane of the plate and the strip portions and removing the smaller particles from the gas stream at this screen and spray assembly.

Also, before the gas from one screening stage is delivered to the next successive stage, entrained droplets are eliminated. The liquids draining from each of the stages are separately collected, thereby providing different classified fractions of the material removed from the gas.

The apparatus comprises a gas flow passage, a plurality of screens arranged in series along the gas flow passage, each screen having liquid sprays associated therewith to form an assembly and at least one screen following the first of the series in the downstream direction formed as a plate with a plurality of punched-out strip portions offset with respect to the plane of the plate and providing slits between the plane of the plate and the offset strip portions and with this latter screen and spray assembly adapted for finer screening than any assembly preceding it in the series.

BRIEF DESCRIPTION OF THE DRAWING

FIG. 1 is a side elevation in section showing apparatus incorporating the present invention.

FIG. 2 is a cross-sectional view taken along the line 2 — 2 of FIG. 1.

FIG. 3 is an enlarged detail showing a portion of one of the slotted impingement plates.

FIG. 4 is a detail in section taken along the line 4 — 4 of FIG. 3.

FIG. 5 is a detail in section taken along the line 5 — 5 of FIG. 4.

FIG. 6 is a detail in section like FIG. 5 but indicating flow in a reverse direction.

FIG. 7 is a detail on an enlarged scale in section showing one type of eliminator which can be used for each of the stages.

DESCRIPTION OF THE PREFERRED EMBODIMENTS

The apparatus shown in the drawing consists of a housing 10 formed of the connected top and side walls 11 and 12. The inlet opening 13 at one end of the housing connects with a source of gas to be cleaned or scrubbed, with the gas moving at velocities which may be within the range of about 4 to 10 ft. per second. In some instances the gas may be delivered by a suitable blower or fan, while in other instances there may be a direct conduit connection to an industrial processing step which is delivering the gas at a relatively uniform and suitable velocity. The outlet opening 14 at the other end of the housing may deliver the scrubbed gas to the atmosphere, or to an industrial processing step. Within the housing a plurality of scrubbing stages A, B And C are established, with the gas being passed successively through these stages. Below each stage the lower walls of the housing are made to provide liquid collecting troughs 16a, 16b and 16c. These troughs connect with drainage pipe 17a, 17b and 17c.

The parts provided in each scrubbing stage include the spray pipes 18 that are provided with spray nozzles 19 and which connect with a common header pipe 21 extending to the exterior of the housing. As desired, the spray nozzles and pipes for each scrubbing stage A, B and C may be connected independently with different sources of liquid, depending upon the particular constituents to be removed. For example, water can be sprayed in one stage to remove particulates and caustic can be sprayed in another stage to remove acid fumes.

Other suitable liquids known to the art may also be utilized.

The pressure at the spray nozzles 19 may be varied between stages, depending upon particular specifications and requirements. Thus, the nozzles for the downstream stages B and C may operate with progressively lower spray pressures than the stage A nozzles, or the reverse order could be used.

On the downstream side of the pipes 18 there is a screen or plate 22 which forms impingement means and which extends at right angle to the general direction of flow. As will be presently explained, each plate 22 is provided with a series of slots through which the gas flows with abrupt change in direction. On the downstream side of each plate 22 there is an eliminator 23 for the purpose of removing entrained liquid droplets from the gas flow. This eliminator may be of a type commonly used in connection with gas scrubbers and which may provide a plurality of nested zigzag plates or baffles through which the gas flows.

The preferred construction of each impingement screen or plate 22 is illustrated in FIGS. 3 – 6. It consists of a flat metal plate provided with a plurality of struck-out metal strip portions 26. As is evident from FIG. 4 each struck-out strip 26 provides an impact surface extending parallel to the main body of the plate 22 but offset from the plane of the same. By virtue of the offsetting, there is a rectilinear slot 27 formed along each edge of each strip portion 26, and the slots are each in a plane at right angles to the plane of the plate 22. The offset portions 16 may be on the downstream side of the plate 22 as shown in FIG. 5, or they may be upon the upstream side as shown in FIG. 6. The choice in this connection depends upon the character of the material in the gas which is to be removed.

While the preferred embodiment illustrates apparatus in which all three stages include the heretofore described impingement plates 22, the invention contemplates that one or more of the plates 22 may be used in cooperation with other gas scrubbing screens of a type known in the art. For example, an impingement plate 22 for fine screening would preferably be positioned downstream of one or more primary scrubbers or screens of the type disclosed in U.S. Pat. No. 3,036,417, e.g., a screen defined by a pattern of rod-like elements.

As previously mentioned, the eliminator 23 for each stage may be constructed to provide zigzag paths for flow of the gas. Such an eliminator is indicated in FIG. 7. The series of plates 28 are bent and nested together to form the zigzag paths 29. When a gas having a considerable amount of liquid in the form of entrained droplets is passed through such an eliminator, the droplets are caused to impinge upon and wet the surface of the plates 28, whereby entrained liquid is effectively removed from the gas. The liquid thus deposited upon the surfaces of the plates 28 drains downwardly.

Operation of the apparatus described above and the carrying out of the method which includes classifying constitutents from a gas stream are as follows. The gas flow to be cleaned is delivered at a relatively uniform velocity to the inlet opening 13, and caused to flow through the housing 10. In the first stage A, the gas is subjected to the scrubbing action of the scrubbing liquid discharged from the spray nozzles 19. The scrubbing action is due not only to contact of spray particles with the gas, but also to the wetting of the upstream surfaces of the plate 22 and struck-out strip portions 26, and the continual impingement of the gas against these surfaces. When the spray particles are discharged from the nozzles with sufficient velocity, there is some shattering and rebound of atomized droplets upon impact with the plate 22, and this aids in obtaining contact of material carried by the gas with the liquid. Gas passing through the plate 22 flows through the slot-like openings 27, which necessarily requires an abrupt change in the flow direction, as will be apparent from FIGS. 5 or 6. This abrupt change aids in effective removal of material from the gas. The gas passages created by the slot-like openings are also effective in creating flow turbulence for increased wetting of the solids. Thus, the strips 26 are aligned in side-by-side relationship so that the flow paths issuing from the confronting openings 27 of any adjacent pair of the strips for the plate of FIG. 5 converge together and turbulently intermix. Similarly, the flow paths entering the openings 27 of each strip for the plate of FIG. 6 converge together and intermix. After the gas has passed through the plate 22, it carries a substantial amount of liquid in the form of entrained liquid droplets. Such liquid droplets are removed by flow of the gas through the eliminator 23.

Liquid which drains downwardly from the stage A is collected in the trough 16a. This liquid is formed by collected spray particles, by liquid flowing downwardly in the form of films on the plate 22 and the portions 26 of the plate, and by liquid flowing downwardly over the surfaces of the baffle elements of eliminator 23.

In flowing downwardly over the wetted impingement surfaces, the liquid accumulates material removed from the gas, and this liquid together with any liquid which falls directly from the sprays into the collecting trough 16a contains materials which have been removed in this stage. The gas then continues to flow through the second scrubbing stage B, where the process described above is repeated. Here again the gas is subjected to the scrubbing liquid, and some of the remaining material contained in the gas is removed and appears in the liquid collected in trough 16b. In scrubbing stage C the process is again repeated, and here again residual material contained in the gas is removed and appears in the liquid collected in trough 16c.

Assuming that the gas carries a variety of contaminants or other materials, there will be selective removal of material in the stages A, B and C, or in other words, there is a classifying action whereby the material in the collected liquid in troughs 16a, 16b and 16c will differ. For example, if the gas carries relatively coarse and relatively fine dust solids, the greater proportion of the coarse solids will tend to be removed in the stage A, whereas the finer dust particles will tend to pass on and be removed in the stages B and C. Also in an instance where the solid particles carried by the gas consist of particles which are readily wettable, and particles which are not as wettable, the more wettable particles will tend to be removed in the collecting trough 16a in preference to the particles which are not readily wettable, and the latter will then tend to be removed in succeeding stages B and C.

In instances where the gas may contain gaseous contaminants such as oxides of sulphur, the first stage is generally most effective in their removal, and they will appear mainly in the material collected in trough 16a. Remaining amounts of such contaminants will be removed in the stages B and C.

As previously stated, the slotted plates 22 are highly effective in promoting effective scrubbing action. The impacting surfaces presented to the spray particles are all at right angles to the general direction of flow through the housing. As previously mentioned, there is an abrupt change in flow direction as the gas flows through the slots 27. The width of these slots may be selected in accordance with the size of the solids carried by the gas. In general, the slots should have a width at least three times the diameter of the largest particles carried by the gas. In some instances, it may be desirable for the plates of the successive stages to differ with respect to the width of the slots 27.

The gas being scrubbed may contain solid particles that are soluble in the scrubbing liquid. In such instances, a part or all of such solids may be dissolved, and such solids will then appear in dissolved form in the effluent collected in troughs 16a, 16b and 16c. A highly soluble material will be largely dissolved in stage A, and will thus appear mainly in the effluent collected in trough 16a.

Apparatus of the type described above will also find application and use in a scrubbing method which does not include clsssifying of the constitutents separated from the gas stream. A method of this character would include delivering the gas flow at a relatively uniform velocity to the inlet opening 13 and causing it to flow through the housing 10 at velocities between 4 – 10 fps. In the separate stages the gas is subjected to the scrubbing action of the scrubbing liquids discharged from the spray nozzles in the three stages. The scrubbing action in each stage is similar to that described above in that the removal of material from the gas results both from contact of spray particles with the gas and from the wetting of upstream surfaces of the plates 22 and struck-out strips 26, and the continual impingement of the gas against these surfaces.

In the method where classification is not required the gas may carry only one, or a plurality, of contaminants or materials to be separated. These materials are of a character such that they will be separated and collected in any of the three stages. The liquid and entrained material drains downwardly in stage A and carries with it the materials separated from the gas in that stage for collection in trough 16a. The gas then continues to flow into the next scrubbing stage B where the scrubbing process is repeated. The scrubbing liquid removes additional material from the gas and drains downwardly where it is collected in trough 16b. The gas continues into stage C where the process is again repeated with residual material removed from the gas by liquid which collects in trough 16c.

An example of the method for scrubbing a gas where classification of the constitutents is not required is as follows: Apparatus of the type described was used for scrubbing the water-saturated airstream produced from a reactor vent system in a complex fertilizer plant. The stream contained ultra-fine ammonium nitrate with minute quantities of ammonia and nitric oxides. The scrubbing apparatus comprised three scrubbing stages with dimensions of 6 feet × 5 feet in cross section and overall length of 16 foot –5 inches. Each stage included two impingement plates 22 having dimensions of 3 feet × 5 feet. Each impingement plate was formed with a plurality of struck-out strips 2 ¼inches long × ¼inch wide offset downstream of the plane of the plates 0.038 inches. The impingement plates were spaced 3 foot –7 inches apart along the length of the scrubber apparatus. The spray apparatus for each stage included 72 nozzles spaced 17 inches upstream of respective impingement plates. Ammonium nitrate scrubbing liquid was sprayed through the nozzles under a pressure of approximately 200 psig. Eliminators 23 having dimensions of 9 27/64 inches wide × 5 –foot 1 ⅛ inches high were positioned in the flow path 7 ⅜ inches downstream of respective plates 22.

The scrubber inlet gas flowed at a rate of 5000 ACFM, a temperature of 180° F, a density of 0.0706 lbs./ft.$^3$ and a particulate loading of 2.2 grain/DSCF. The pressure drop across the scrubber apparatus was measured in two inches of water. The scrubber outlet gas flowed at a rate of 5000 ACFM, a temperature of 180° F, a density of 0.0706 lbs./ft.$^3$ and a particulate loading of 0.055 grain/DSCF. The opacity was determined to be 1.0 Ringelmann number. The saturated gas velocity was measured at 167 fpm.

The scrubbing liquor comprised a concentration of 0 – 50 percent $NH_4NO_3$ and flowed at a volume of 340 USGPM at 200 psig with a temperature of 180° F. Make-up water additions amounted to 34 USGPM.

The following summarizes the collection efficiencies on particulate matter of varying size:

| Particle Size | Collection Efficiency |
|---|---|
| + 0.5 microns | 100% |
| – 0.5 + 0.25 microns | 86% |
| – 0.25 microns | 77% |
| Average | 97.5% |

No detectable difference in either outlet fume loadings or stack opacities were noted operating with fresh water or recycled liquor containing up to 50percent $NH_4NO_3$ concentrations.

The foregoing illustrates that the invention is capable of collecting and removing relatively small particles with very high efficiency as compared to known scrubbing apparatus and methods.

I claim:

1. Gas cleaning apparatus comprising a gas flow passage, a plurality of screens arranged in series along the gas flow passage, each screen having liquid sprays associated therewith to form an assembly with the liquid sprays being directed toward respective screens on the sides thereof upstream of the gas flow, at least one screen following the first of the series in the downstream direction formed as a plate with a plurality of punched-out strip portions offset with respect to the plane of the plate and with the major area of the punched-out strips parallel to the plane of the plate to provide openings on each side of the strip portions transverse to the gas flow passage, with this latter screen and spray assembly being adapted for finer screening than any assembly preceding it in the series.

2. Gas cleaning apparatus as claimed in claim 1 in which the strip portions are offset towards the upstream side of the gas flow passage.

3. Gas cleaning apparatus as claimed in claim 1 in which the strip portions are offset towards the downstream side of the gas flow passage.

4. Gas cleaning apparatus as claimed in claim 1 in which screens on either side of the screen defined are made of rod-like elements.

5. Gas cleaning apparatus as claimed in claim 4 in which sprays are adapted for use with different liquid pressures for each screen.

6. Gas cleaning apparatus as claimed in claim 4 in which sprays are adapted for use with different liquids for each screen.

7. Gas cleaning apparatus as claimed in claim 4 in which separate collection troughs are associated with each screen.

8. Gas cleaning apparatus as claimed in claim 4 in which moisture eliminators are located in the gas flow passage after each screen.

* * * * *